United States Patent
Blichmann

(10) Patent No.: US 10,253,284 B2
(45) Date of Patent: Apr. 9, 2019

(54) MODULAR KEG AND CONICAL FERMENTOR

(71) Applicant: John R. Blichmann, Lafayette, IN (US)

(72) Inventor: John R. Blichmann, Lafayette, IN (US)

(*) Notice: Subject to any disclaimer, the term of this patent is extended or adjusted under 35 U.S.C. 154(b) by 477 days.

(21) Appl. No.: 14/557,977

(22) Filed: Dec. 2, 2014

(65) Prior Publication Data
US 2015/0152370 A1 Jun. 4, 2015

Related U.S. Application Data

(60) Provisional application No. 61/911,299, filed on Dec. 3, 2013.

(51) Int. Cl.
*C12C 13/10* (2006.01)

(52) U.S. Cl.
CPC .................. *C12C 13/10* (2013.01)

(58) Field of Classification Search
CPC ...... C12C 13/10; C12C 11/006; C12C 11/003
USPC .......... 99/275, 276, 277, 277.1, 277.2, 278; 220/320, 81 R, 226
See application file for complete search history.

(56) References Cited

U.S. PATENT DOCUMENTS

| | | | | |
|---|---|---|---|---|
| 1,681,150 A | * | 8/1928 | Vischer, Jr. | A47J 27/0813 220/240 |
| 1,713,612 A | * | 5/1929 | McCrery | B65D 7/34 220/319 |
| 1,751,140 A | * | 3/1930 | Field | B27K 3/10 118/408 |
| 1,784,516 A | * | 12/1930 | Fairbanks | A47J 47/14 220/320 |
| 2,108,024 A | | 2/1938 | Shanor | |
| 2,393,518 A | * | 1/1946 | Towers | C12C 11/003 426/16 |
| 2,655,397 A | * | 10/1953 | Augspurger | F16J 13/065 220/321 |
| 2,916,421 A | * | 12/1959 | Schwaiger | C12C 7/16 210/411 |
| 3,346,139 A | * | 10/1967 | Armstrong, Jr. | B65D 45/32 220/320 |
| 3,464,435 A | * | 9/1969 | Lamb | B67D 1/0832 137/212 |
| 3,528,889 A | * | 9/1970 | Portno | C12C 11/075 435/301.1 |
| 3,670,929 A | * | 6/1972 | Berry | B67D 1/0831 222/400.7 |
| 3,823,655 A | * | 7/1974 | Potter | C12G 1/02 99/277 |
| 3,871,272 A | * | 3/1975 | Melandri | C12G 1/0216 366/137 |
| 4,015,745 A | * | 4/1977 | Petrangelo | H02B 1/28 174/521 |
| 4,164,902 A | * | 8/1979 | Maarleveld | C12G 1/02 210/209 |
| 4,205,133 A | | 5/1980 | Wick | |

(Continued)

*Primary Examiner* — Jimmy Chou
(74) *Attorney, Agent, or Firm* — Tyler B. Droste; Gutwein Law

(57) ABSTRACT

A system or arrangement for making and using a modular keg and bottom is disclosed. The modular keg includes one of a domed bottom or a conical bottom. An improved sealing system is also disclosed to sealably affix the bottom to the keg body.

23 Claims, 15 Drawing Sheets

(56) References Cited

U.S. PATENT DOCUMENTS

| | | | | |
|---|---|---|---|---|
| 4,593,612 A * | 6/1986 | Rieger | ............... | B01F 15/068 366/144 |
| 4,665,807 A * | 5/1987 | Rieger | ............... | B01F 5/10 99/277.1 |
| 4,754,698 A * | 7/1988 | Naish | ............... | C12C 13/10 99/275 |
| 5,543,087 A * | 8/1996 | Lee | ............... | B01D 33/067 210/220 |
| 5,823,340 A * | 10/1998 | Maihofer | ............... | A61L 2/26 206/366 |
| 5,957,328 A * | 9/1999 | Osgar | ............... | B67D 7/0294 222/1 |
| 6,279,457 B1 * | 8/2001 | Francia | ............... | C12G 1/0216 99/277 |
| 6,311,875 B1 * | 11/2001 | Anderson | ............... | B67D 1/0832 222/396 |
| 6,536,468 B1 * | 3/2003 | Wilmer | ............... | B01F 3/0857 137/544 |
| 7,082,871 B2 * | 8/2006 | Schultz | ............... | A47J 27/0813 220/316 |
| 8,601,936 B2 * | 12/2013 | Williams | ............... | C12C 11/006 426/11 |
| 9,546,348 B2 * | 1/2017 | Greene, Jr. | ............... | C12C 13/10 |
| 2004/0129144 A1 * | 7/2004 | Beadle | ............... | C12C 13/10 99/275 |
| 2004/0149137 A1 * | 8/2004 | Francia | ............... | C12G 1/0216 99/276 |
| 2005/0279214 A1 * | 12/2005 | Blichmann | ............... | B65D 45/32 99/276 |
| 2008/0000356 A1 * | 1/2008 | Eustis | ............... | C12H 1/16 99/277.2 |
| 2009/0104308 A1 * | 4/2009 | Waidelich | ............... | C12G 1/06 426/15 |
| 2009/0193978 A1 * | 8/2009 | Blichmann | ............... | B65D 45/32 99/276 |
| 2009/0285971 A1 * | 11/2009 | Broderick | ............... | C12C 7/065 426/627 |
| 2010/0129490 A1 * | 5/2010 | Williams | ............... | C12C 11/006 426/11 |
| 2013/0202736 A1 * | 8/2013 | Reeves | ............... | C12C 13/00 426/11 |
| 2013/0340624 A1 * | 12/2013 | Webber | ............... | C12C 11/00 99/276 |

* cited by examiner

US 10,253,284 B2

MODULAR KEG AND CONICAL FERMENTOR

This invention relates generally to a modular keg and conical fermenter and more particularly to a low cost home brewing keg, whereby a bottom of the keg is removably affixed and may be interchangeably switched, one bottom wish another bottom.

It is well known in the an to use a "Cornelius™" type soda keg or a "Sankey™" type beer keg to store, carbonate, and dispense beer. The Cornelius™ type is particularly sailed for use in smaller operations, such as at home. These Cornelius™ kegs, commonly referred to in the an as a corny keg, were an extremely popular storage vessel for soda such as Pepsi® and Coke®. They have a large elliptical opening (hatch) to facilitate easy cleaning by land compared to a traditional Sankey beer keg, where special tooling, training, and equipment is seeded to disassemble for proper cleaning and refilling. Also fitted to the lop of the corny keg are two posts: one for the admittance of $CO_2$ gas and the other for the withdrawal of beer or other liquid product.

However, the cost of these fermenters is prohibitive to many smaller brewers, and nearly all home brewing-sized conical fermenters do not tolerate the high pressures required for carbonation. Since the beer is in a conical vessel undergoing fermentation for a much shorter period of time than storage kegs, which have rounded end portions, far fewer conical vessels are typically repaired than are storage kegs for a brewer. Therefore, the lower cost soda kegs are traditionally utilized for carbonados, long term storage and dispensing, and the expensive conical vessels are reserved solely for fermentation. But the distinct disadvantage in the utilization of separate conical vessels and storage kegs is that this setup requires transferor liquid from one vessel to another, thereby exposing the beer to potential bacterial contamination and oxidation, and further necessitates the cleaning and sanitizing of additional equipment. However, this trade-off has become a common-place concession for brewers that want to utilize as few of conical fermenters as possible.

The present invention is directed to overcome one or more of she problems as set forth above.

SUMMARY OF THE INVENTION

The present disclosure is directed to a fermentation assembly comprising s keg body having a first end and a second end on closing ends of the keg body and a body wall able to withstand at least about 5 psi of internal pressure; a top member that is fixedly joined to the first end of the keg body; wherein the second end of die keg body interchangeably, sealably joined to either a first removable bottom member via a sealing joint system era second removable bottom member via a sealing joint system; whereby the first removable bottom member excludes a liquid-in/gas-out port; and wherein the second removable bottom member has a first end portion and a second end portion, the first end portion being configured such that the cross-sectional area of the first end portion is less than 33% of the cross-sectional area of the second end portion, and such that the second end portion sealably joins with the second end of the keg body.

The present disclosure is also directed to a keg for fermenting and storing liquids comprising a cylindrical keg body having a first end and a second end on opposing ends of the keg body configured to withstand at least about 5 psi of internal pressure a pressure relief system; a plurality of passages; and a top member that is joined to the first end of the keg body, the top member having an opening and a removable access hatch and a handle portion; wherein the second end of the keg body is configured to be interchangeably, sealably joined to a removable bottom member via a sealing joint system drat has a clamp comprising two leg members and so o-ring.

Further, the present disclosure is directed to a removable conical member of a fermentation assembly comprising a cylindrical first end portion being in communication with a valve; and a cylindrical second end portion configured to sealably join to a keg body via a sealing joint system; wherein the first end portion is configured such that the cross-sectional area of the first end portion is less than 33% of the cross-sectional area of the second end portion, and such that the second aid portion sealably joins with the second end of the keg body; and wherein the conical member has s volume of as least about 0.33 gallons.

DETAILED DESCRIPTION

Figure 1:
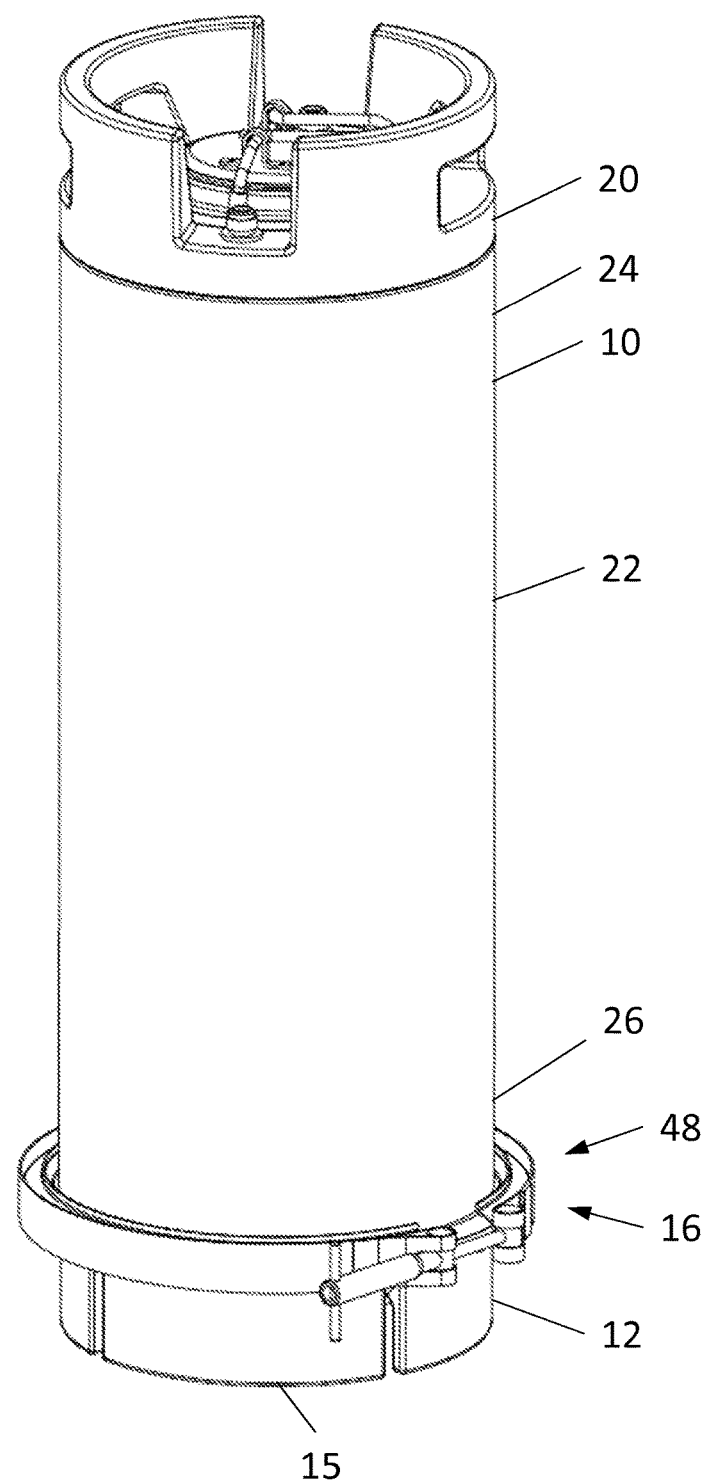
FIG. 1 is a front pictorial view of a keg having a domed or concave configuration removably affixing a bottom at a joint to the keg.

As shown in FIG. 1, a keg portion design having a sealably removable sealed bottom 12. The keg is preferably a corny-type keg, also known as a conical keg. The keg 10 has a bottom style containing the liquid-out and gas-in ports removed. FIG. 1 also shows a sealably removable bottom 12 having a domed or concave configuration or shape 15 affixed to the keg 10 at a joint system 16.

The keg 10 has a top portion 20 spaced from the bottom 12 and a cylindrical body portion 22. The body portion 22 has a first end portion 24 and a second end portion 26. Each of the top portion 20, the body portion 22 and the bottom 12 has sufficient wall thickness and joint design to provide structural integrity for withstanding high pressures (i.e., at least about 5 psi, or at least about 20 psi, or at least about 40 psi, or at least about 60 psi, or at least about 100 psi, or at least about 130 psi) required for carbonation.

Figure 2:
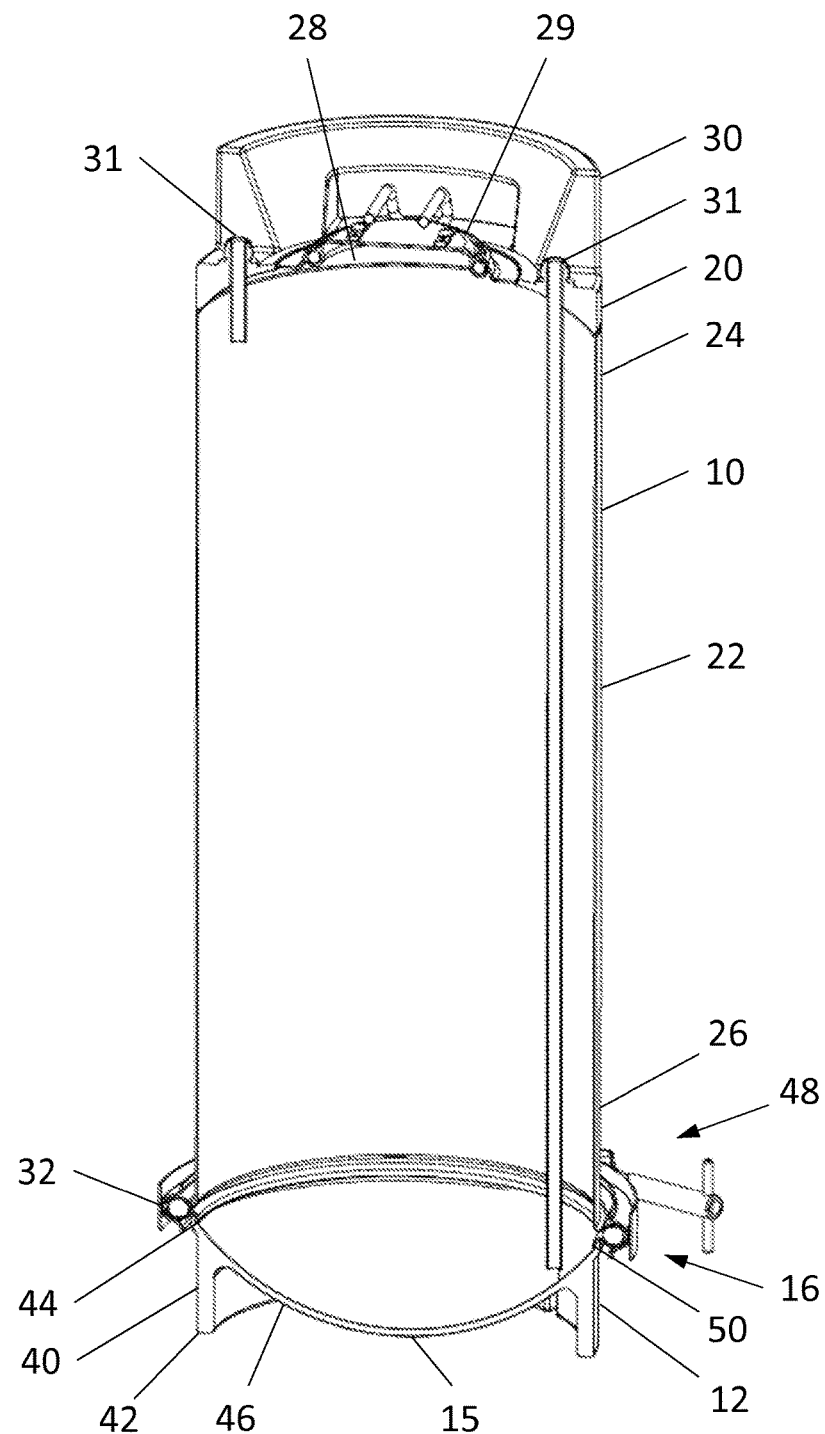
FIG. 2 is a cross-sectioned view of the keg of FIG. 1.

As shown in FIG. 2, the cross-sectioned view of keg 10 may have an opening 28 positioned in top portion 20. The opening 28 may be round or elliptical as desired and has a removable access hatch 29 fitted into opening 28, comprising, for example, a tri-clamp fitting. As an alternative, opening 28 or hatch 29 may be eliminated. Furthermore, top portion 20 optionally includes a handle portion 30. Furthermore, a plurality of passages 31 are positioned in the keg. For example, one passage may be used for the admission of gas (such as, for example, $CO_2$) and another may be used for dispensing of liquid contained in the keg 10. Additionally, an airlock, similar vent or pressure relief system may be provided, as known in the art.

As further shown in FIG. 2, body portion 22 is fixedly joined to top portion 20 at first end portion 24 using known joining techniques, such as by welding, brazing, and mechanical joining techniques (such as, for example, a v-band clamp), or other methods of joining known in the manufacturing art. The body portion 22 has a joint 32 (discussed further below) formed or attached to second end portion 26.

As further shows in FIG. 2, the bottom 12 has a domed (i.e., generally convex) bottom configuration 15. As an alternative, the bottom could be flat or domed inwardly (i.e., generally concave), so long as the structure is able to support internal pressure of i.e., at least about 5 psi, or at least about 20 psi, or at least about 40 psi, or at least shout 60 psi, or at least about 100 psi, or at least about 130 psi. In one optional embodiment, for example, an optional leg portion 40, which for example may be cylindrical, extends between a first end portion 42 and a second end portion 44. The kg portion 40 may have a segmented configuration, but as an alternative, could be a complete cylindrical configuration. Or, as a further alternative leg portion 40 could be eliminated. The first end portion 42 supports keg 10 and the removable bottom portion 12 in an upright position as shown in FIG. 1. A domed (i.e., generally convex) member 46 extends generally from the first end portion 42 to the second end portion 44. The second end portion 44 of the bottom 12 has a sealing joint 48 attached thereto. The scaling joint 48 may be formed in the second end portion 44 or may include a separate sealing joint piece 50. The separate scaling joint piece 50 and the bottom 12 are sealably joined in a known manner, such as by a welded or brazed joint or a pressed fit connection.

Figure 3:
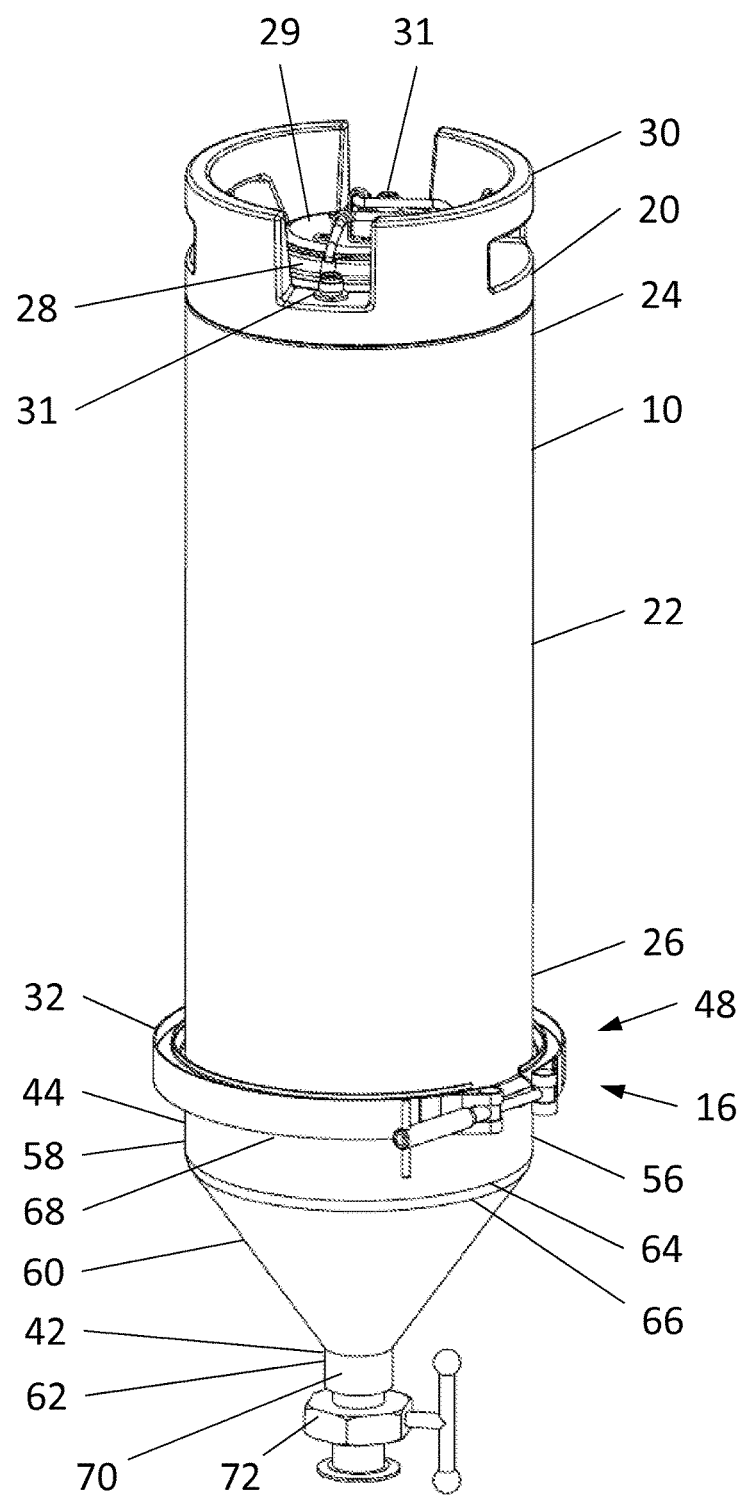
FIG. 3 is a front pictorial view of a keg having a conical configuration removably affixing the bottom at the joint to the keg.

As shown again in FIG. 3, keg 10 comprises removable bottom 12. The keg 10 may be any suitable keg style, and is in one preferred embodiment a corny-type keg. The corny-type keg 10 has a bottom wherein the liquid-out/gas-in ports have been removed, in FIG. 3 the bottom 56 has a sealably removably conical configuration or shape 56 affixed to keg 10 at joint system 16. Again, keg 10 has a top portion 20 spaced from bottom 12 by cylindrical body portion 22. The body portion 22 has first end portion 24 and second end portion 26. Each of the portion 20, body portion 22 and bottom 12 has structural integrity so withstand high pressures required for carbonation. For example, carbonation at about 40° F. generates roughly 12-15 psi, but can rise as the liquid temperature rises. Accordingly, each of portion 20, body portion 22, and bottom 12, as well as joint system 16, must be able to withstand pressures of at least about 5 psi, or at least about 20 psi, or at least about 40 psi, or at least about 60 psi, or at least about 100 psi, or at least about 130 psi.

Figure 4:
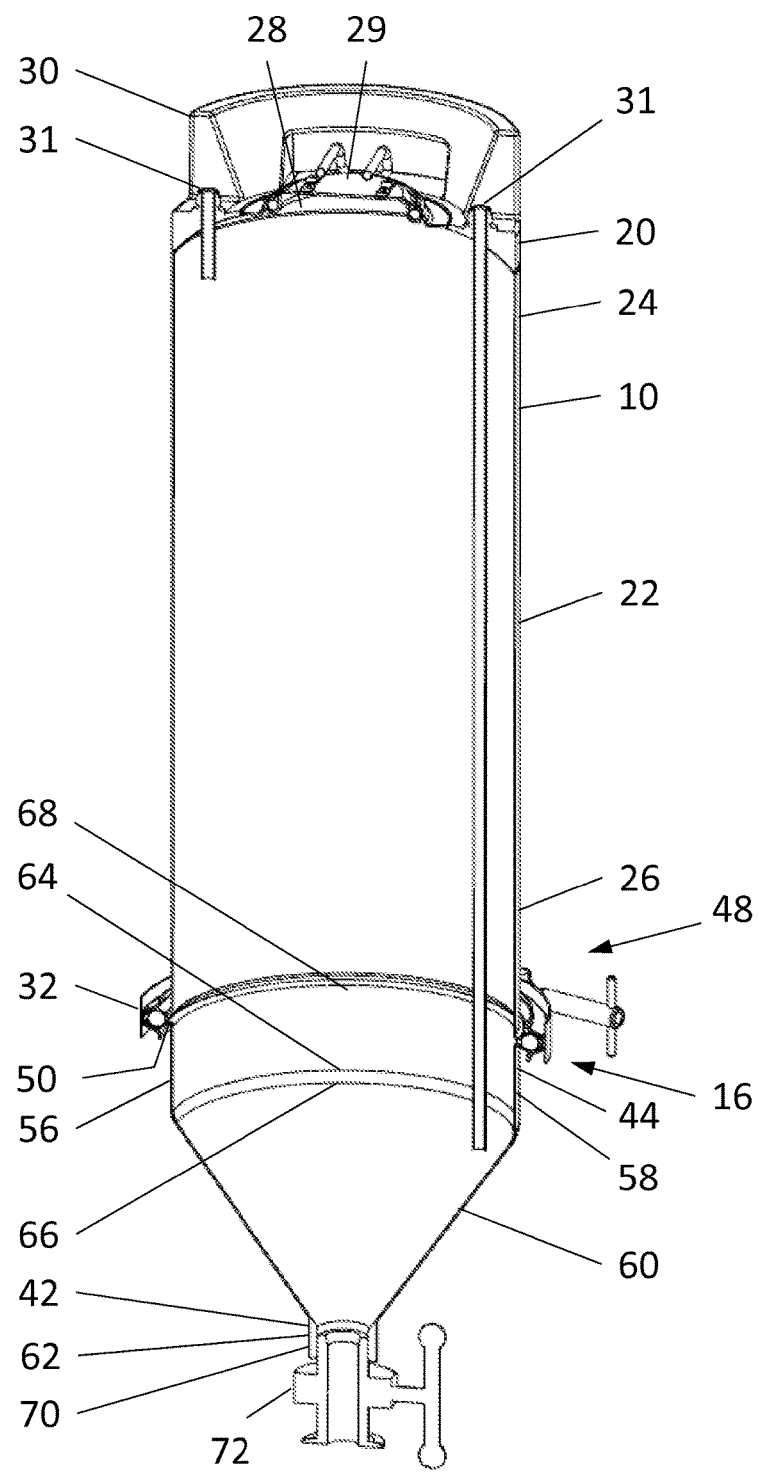
FIG. 4 is a sectioned view of the keg of FIG. 3.

As shown in FIG. 4, the sectioned keg 10 shown has large opening 28 positioned in top portion 20. The opening 28 may be round or elliptical as desired and has removable access hatch 29 fitted into opening 28. As an alternative, opening 28 or hatch 29 may be eliminated. Furthermore, top portion 29 includes handle portion 30, being of design generally known in the art. Furthermore, a plurality of passages 31 can be positioned in keg 10. For example, one passage could be used for the admission of gas (such as, for example, $CO_2$) and another used for dispensing of liquid contained in keg 10. Additionally, a vent, such as for example an airlock or similar vent or pressure relief system, can fee included.

As further shown in FIG. 4, body portion 22 is fixedly joined to top portion 20 at first end portion 24 such as by welding, brazing or other methods of joining known in manufacturing. The body portion 22 has joint 32 formed or attached to second end portion 26.

As further shown in FIG. 4, the bottom 56 may have a conical configuration or shape 56. As an alternative, the shape could be elliptical or generally dome-shaped or any suitable shape that would provide a flow of sedimentary material toward the bottom of the shape. As a further alternative, a racking port or racking arm suitable for sampling and draining could be included. For example, an optional cylindrical wall portion 58 is attached to a conical wall portion 60. The wall portions 58 and 60 extend between the first end portion 42 and the second end portion 44. For example, the conical wall portion 60 has a first end portion 62 spaced from a second end portion 64 a preestablished distance to impart a degree slope of between about 30 and about 45 degrees. Moreover, the cross-sectional area of the first end portion 62 is less than 33% of the cross-sectional area of the second cud portion 64. Further, optional cylindrical wall portion 58 has a first end portion 66 spaced from a second end portion 68 a preestablished distance. The preestablished distance can vary, thus providing multiple available capacities for the apparatus. One embodiment includes a preestablished distance sufficient to result in a bottom 56 volume of at least stout 5% of the volume of the keg body, or as feast about 15% of the volume of keg body 10, or at least about 20% of the volume of key body 10, or at least about 25% of keg body 10, or between about 15% and about 25% of keg body 10. In varying embodiments, the volume of bottom 56 is about 0.33 gallons, or at least about 0.33 gallons, or about 0.75 gallons, or about 1.5 gallons, or about 2.0 gallons, or at least about 1-5 gallons, or at least about 2.0 gallons. The second end portion 64 of the conical wall portion 60 is connected to the first end portion 66 of the cylindrical wall 58. The first end portion 62 of the conical wall portion 60 has an opening or threaded hole 70 therein. A valve 72 that, is configured to fee operated between an opened and closed position, best shown in FIG. 3, is attached therein. The second end portion 68 of cylindrical wall 58 has sealing joint 48 attached thereto. The scaling joint 48 may be formed in second end portion 68 or may include a separate sealing joint piece 50. The separate sealing joint piece 50 and second end portion 68 of cylindrical wall portion 58 of bottom 12 are sealably joined in a known manner, such as by a welded or brazed joint or a pressed fit connection. As an alternative, bottom 12 with conical configuration or shape 56 could include only conical wall portion 60 and cylindrical wall portion 58 could be eliminated. In this configuration, second end portion 64 of conical wall portion 60 would be connected to sealing joins 48.

Figure 5:
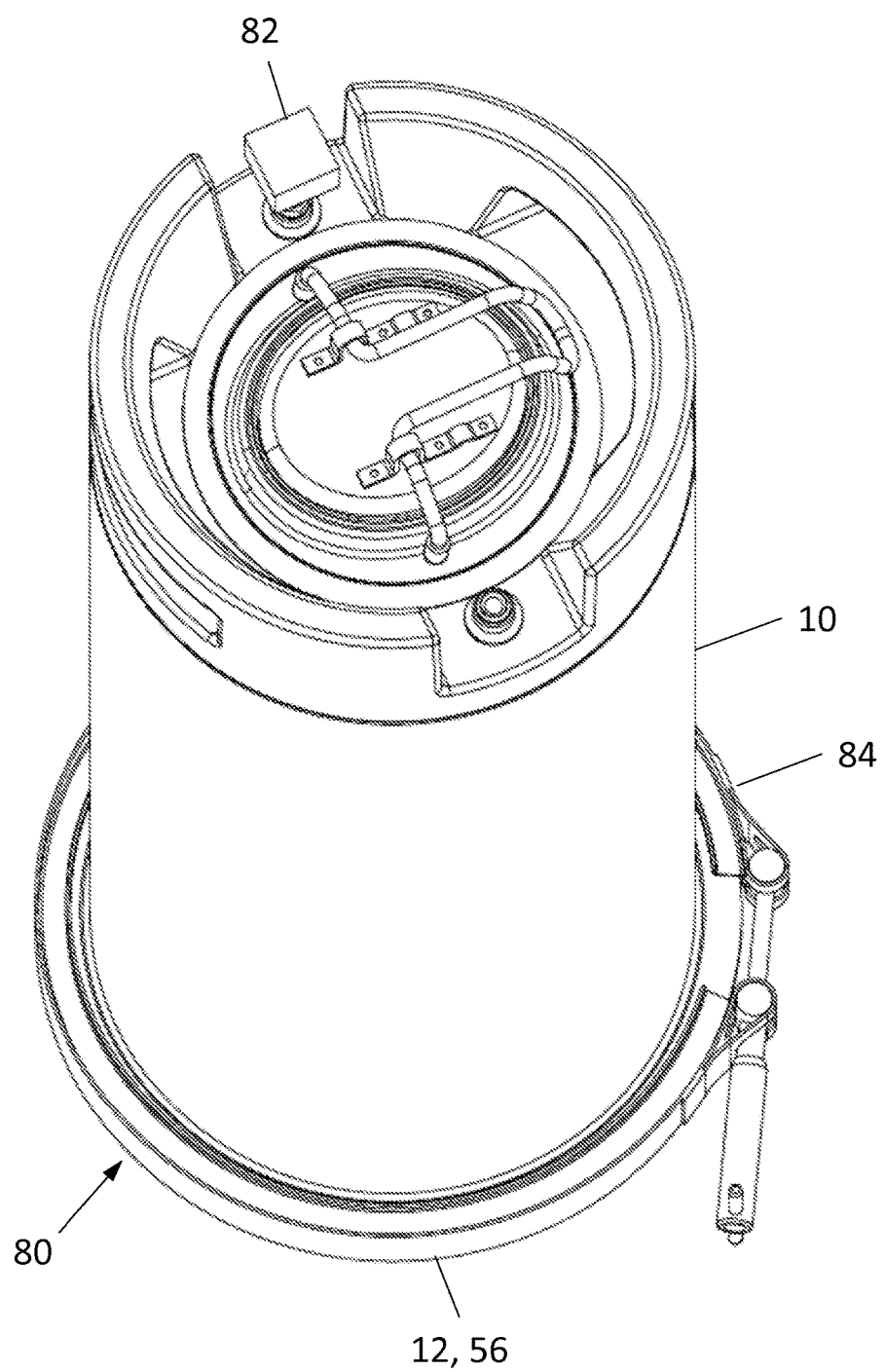
FIG. 5 is a top perspective view of a keg having one of the domed or concave or the conical configuration removably affixing the bottom at the joint to the keg.

FIG. 5 shows keg 10 with sealing mechanism 80 joining bottom 12,56 to the modified corny-type keg or other structure in its removably sellable fixed configuration. Also, an optional pressure relief system or simple air lock pressure relief system 82 are shown. A clamp 84 affixes bottom 12,56 so keg 10. As an alternative, other types of suitable clamping systems could be used. For example, a plurality of bolts and nuts, screws, a plurality of "C" clamps or threaded type clamps, a sanitary (tri-clamp) design, or a draw latch type design could fee used.

Figure 6:
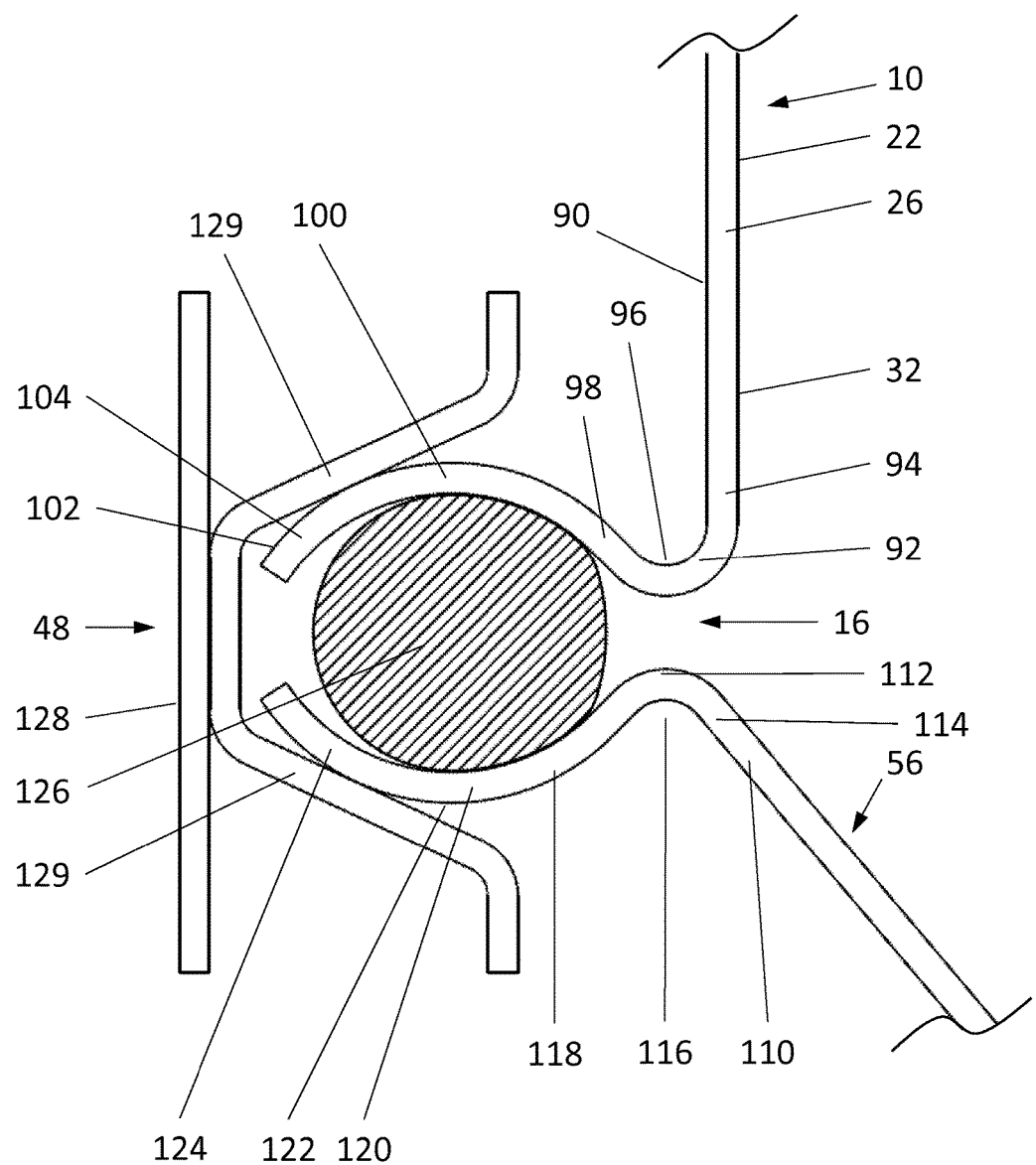
FIG. 6 is a detailed sectional view of the circular sealing joint of one of the sealing arrangements sealably, removably affixing the bottom at the joint to the keg of FIG. 5.

FIG. 6 shows one of the optional designs for sealing joint 48. For example joint system 16 includes joint 32 attached to or formed in the second end portion 26 of body portion 22 of keg 10. Joint 32 has a straight cylindrical member 90 extending from second end portion 26 of body portion 22. Attached to cylindrical member 90 is a cylindrical "U" shaped member 92 defining a first leg 94, a bottom 96 and a second leg 98. First leg 94 is attached to cylindrical member 90 and second leg 98 is attached to a first arched portion 100 of a cylindrical flange member 102. Cylindrical flange 102 farther includes a second arched portion 104.

In FIG. 6, scaling joint 48 of bottom 56 includes a conically cylindrical member 110 being attached to or formed in second end portion 44 of bottom 56. Attached to conically cylindrical member 110 is a cylindrical "U" shaped member 112 defining a first leg 114, a bottom 116 and a second leg 118. First leg 114 is attached to conically cylindrical member 110 and second leg 118 is attached so a first arched portion 120 of a cylindrical flange member 122. Cylindrical flange 122 farther includes a second arched portion 124. Interposed in first arched portion 100 and second arched portion 104 of cylindrical flange member 102 and first arched portion 120 and second arched portion 124 of cylindrical flange member 122 is an o-ring 126. A clamp 128 has a pair of legs 129 in contacting relationship with second arched portion 104 of cylindrical flange member 102 and second arched portion 124 of cylindrical flange member 122, thus forming a removably sealing joint 48. As an alternative, other types of clamping systems could be used. For example, a plurality of bolts and nuts, screws or a plurality of "C" clamps or threaded type clamps, a sanitary (tri-clamp) design, or a draw latch type design could be used.

Figure 7:
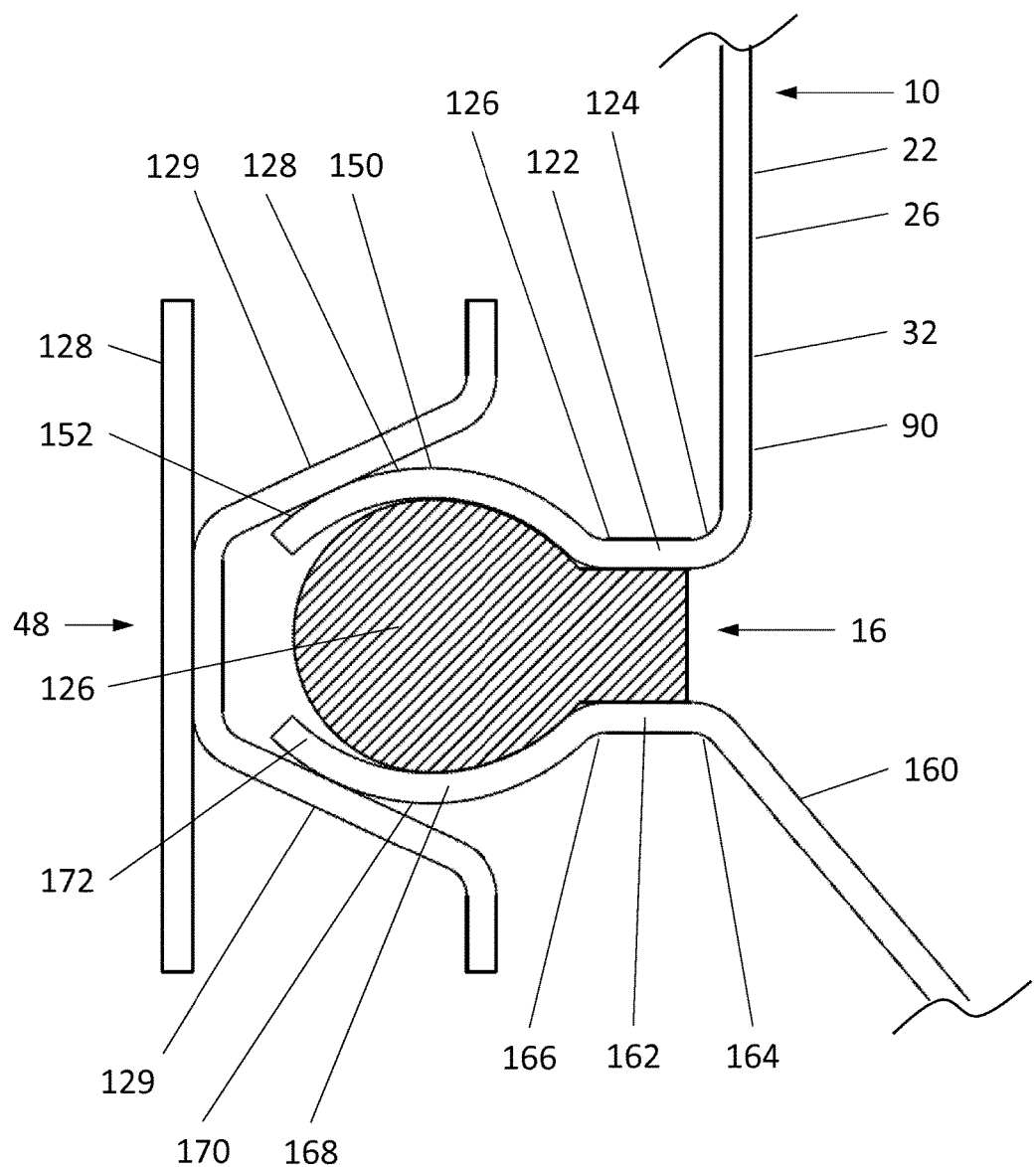
FIG. 7 is a detailed sectional view of a circular sealing joint of another one of the sealing arrangements sealably, removably affixing the bottom at the joint to the keg of FIG. 5.

In FIG. 7, joint system 16 includes joint 32 attached to or formed in second end portion 23 of body portion 22 of keg 10. Joint 32 has a straight cylindrical member 90 extending from second end portion 26 of body portion 22. Attached to cylindrical member 90 is a cylindrical plate member 122 defining a first end 124 and a second end 126. The first end 124 is attached to straight cylindrical member 90 and second end 126 is attached to a first arched portion 128 of a cylindrical flange member 150. Cylindrical flange 150 further includes a second arched portion 152. The sealing joint 48 of bottom 56 includes a conically cylindrical member 160. Attached to conically cylindrical member 160 is a cylindrical plate member 162 defining a first end 164 and a second end 166. First end 164 is attached to conically cylindrical member 160 and second end 166 is attached to a first arched portion 168 of a cylindrical flange member 170. The cylindrical flange 170 further includes a second arched portion 172. Interposed in first arched portion 128 and second arched portion 152 of cylindrical flange member 150 and first arched portion 168 and second arched portion 172 of cylindrical flange member 170 is o-ring 126. The clamp 128 has a pair of legs 129 in contacting relationship with second arched portion 152 of cylindrical flange member 150 and second arched portion 172 of cylindrical flange member 170, thus forming removably sealing joint 48. As an alternative, other types of clamping systems could be used. For example, a plurality of bolts and nuts, screws or a plurality of "C" clamps or threaded type clamps, a sanitary (tri-clamp) design, or a draw latch type design could be used.

Figure 8:
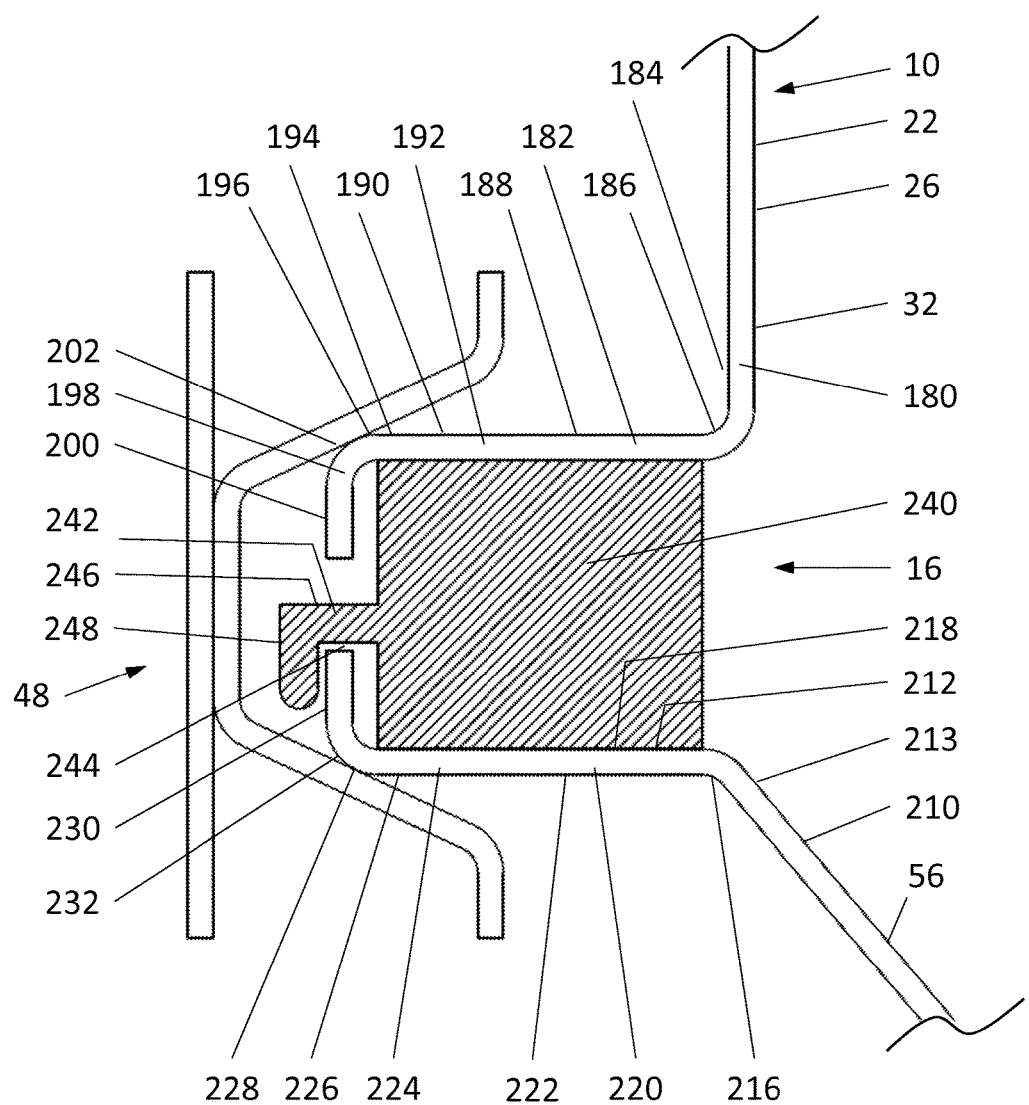
FIG. 8 is a detailed sectional view of a circular sealing joint of another sealing arrangement sealably, removably affixing the bottom at the joist to the keg of FIG. 5.

In FIG. 8, joint system 16 includes joint 32 attached to or formed in second end portion 26 of body portion 22 of keg 10. Joint 32 has a straight cylindrical member ISO extending from second aid portion 26 of body portion 22. Attached to cylindrical member 180 is a first cylindrical "L" shaped plate member 82 defining a first end 184, a radiused portion 186 and a second end 188. The first end 184 is attached to straight cylindrical member 180 and second end 188 is attached to a first end 190 of a cylindrical flat plate 192 further having a second end 194. The second end 194 of cylindrical flat plate 192 is attached to a first end 196 of a second cylindrical "L" shaped plate member 198 having a second end 200 and a radiused portion 202 extending between first end 196 and second end 200. The sealing joint 48 of bottom 56 includes a conically cylindrical member 210. Attached to conically cylindrical member 210 is a first cylindrical bent-shaped plate member 212 defining a first end 213, a radiused portion 216 and a second end 218. The first end 212 is attached to conically cylindrical member 210 and second end 218 is attached to a first end 220 of a cylindrical flat plate 222 further having a second end 224. The second end 224 of the cylindrical flat plate 222 is attached to a first end 226 of a cylindrical "L" shaped plate member 228 having a second end 230 and a radiused portion 232 extending between first end 226 and second end 230. In this application, second end 200 of second cylindrical "L" shaped plate member 198 is oriented downward or toward second end 230 of cylindrical "L" shaped plate member 228 and second end 230 of cylindrical "L" shaped plate member 228 is oriented upward or toward the second end 200 of the second cylindrical "L" shaped plate member 198. A generally square or rectangular shaped seal 240 is interposed in cylindrical flat plate 192 and cylindrical "L" shaped plate member 198 and cylindrical flat plate 222 and cylindrical "L" shaped plate member 228.

As shown in FIG. 8, the generally square or rectangular shaped seal 240 includes a generally "L" shaped retains ring 242. The generally "L" shaped retainer ring 242 forms a pocket or retainer space 244. When positioned in sealing joint 48, pocket 224 may nest about second end 230 of cylindrical "L" shaped plate member 228. As an alternative, pocket 224 could nest about second end 200 of second cylindrical "L" shaped plate member 198. The pocket or retainer space 244 is defined by a horizontal keg 246 and a vertical leg 248. Each of the horizontal legs 246 and the vertical leg 248 having a preestablished thickness and a preestablished length. More particularly, the length of each of horizontal leg 246 and vertical leg 248 is at least twice their thickness. Furthermore, pocket or retainer space 244 should nest or fit generally snuggly about second end 230 of cylindrical "L" shaped plate member 228.

Figure 9A:
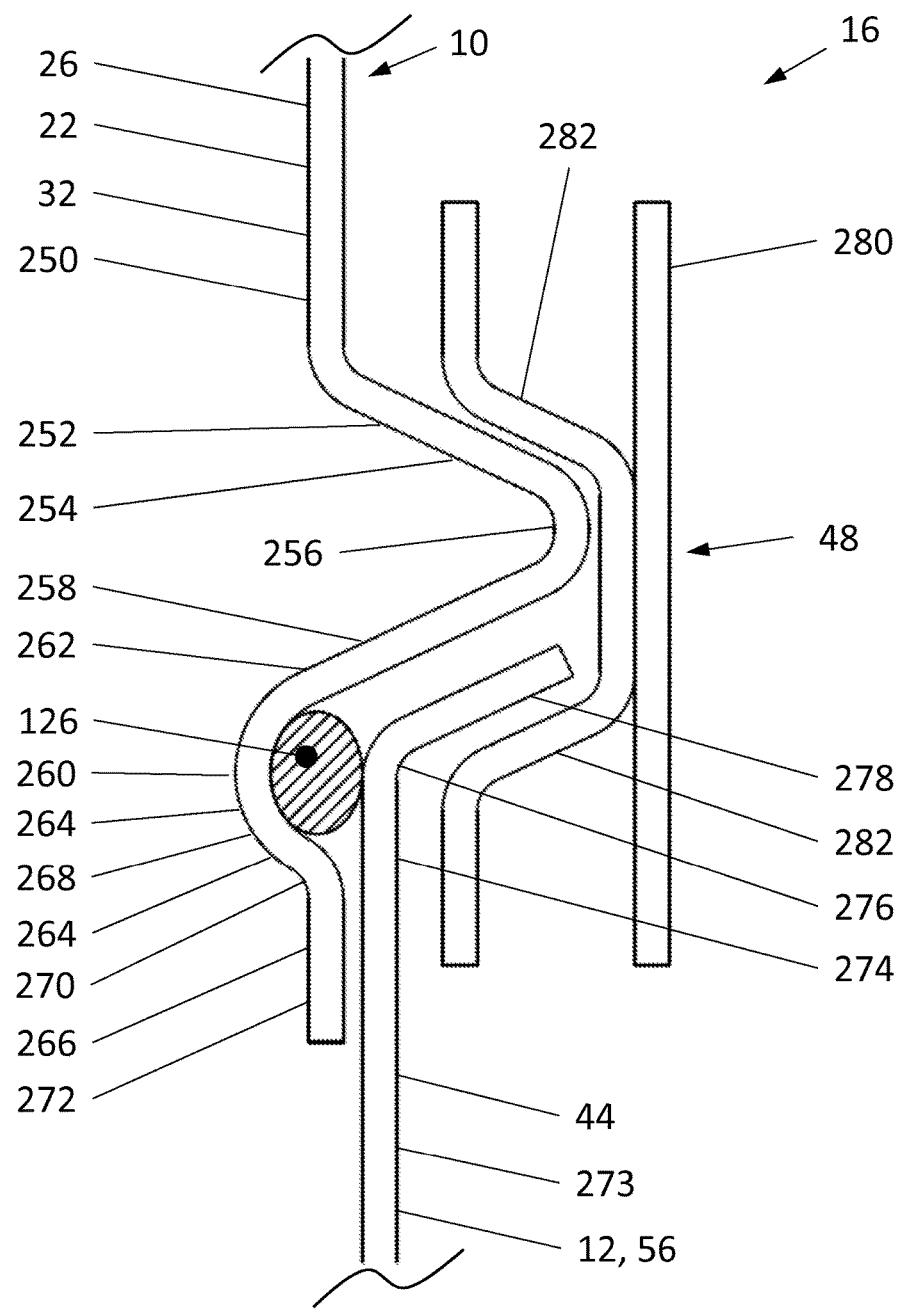
FIGS. 9a, 9b, and 9c are detailed sectional views taken through a circular sealing joint of another sealing arrangement sealably, removably affixing the bottom at the joint to the keg, with the figures showing alternate configurations of the bottom design.

FIG. 9a shows an alternate design for joint 48. For example, joint system 16 includes joint 32 being attached to or formed in second end portion 26 of body portion 22 of keg 10. In one configuration, joint 32 has a straight cylindrical member 250 extending from second end portion 26 of body portion 22. Attached to cylindrical member 250 is a generally "V" shaped member 252 defining a first angled leg 254 connected to a curved or apex portion 256 connected to a second angled leg 258. The first angled leg 254 is attached to cylindrical member 250 and second angled leg 258 is attached to a cylindrical segmented spherical portion 260 at a first end 262 and having a second end 264 attached to a cylindrical radiused "L" shaped portion 266. In this configuration, the cylindrical radiused "L" shaped portion 266 comprises a first end 268 attached to second end 264 of cylindrical segmented spherical portion 260. A radiused portion 270 of cylindrical radiused "L" shaped portion 266 is interposed in first end 268 and a cylindrical member 272. Attached or formed in bottom 12,56 is a cylindrical conical member 273. The cylindrical conical member 273 has a first end portion 274 attached to second end portion 44 of bottom 12,56. A radiused member 276 is interposed in first end portion 274 and a cylindrical conical member 278 of the cylindrical conical member 273. An o-ring 126 is interposed in cylindrical segmented spherical portion 260 and cylindrical member 270. A clamp 280 having a pair of legs 282 is in contacting relationship with first angled leg 254 and cylindrical conical member 278, and when tightened, forms a sealed joint 48. As an alternative, joint 48 as described above could be reversed with the generally "V" shaped member 252 being termed on bottom 12,56 and cylindrical conical member 278 being formed on keg 10. As an alternative, other types of clamping systems could be used. For example, a plurality of bolts and nuts, screws or a plurality of "C" clamps or threaded type clamps, a sanitary (tri-clamp) design, or a draw latch type design could be used.

Figure 9B:
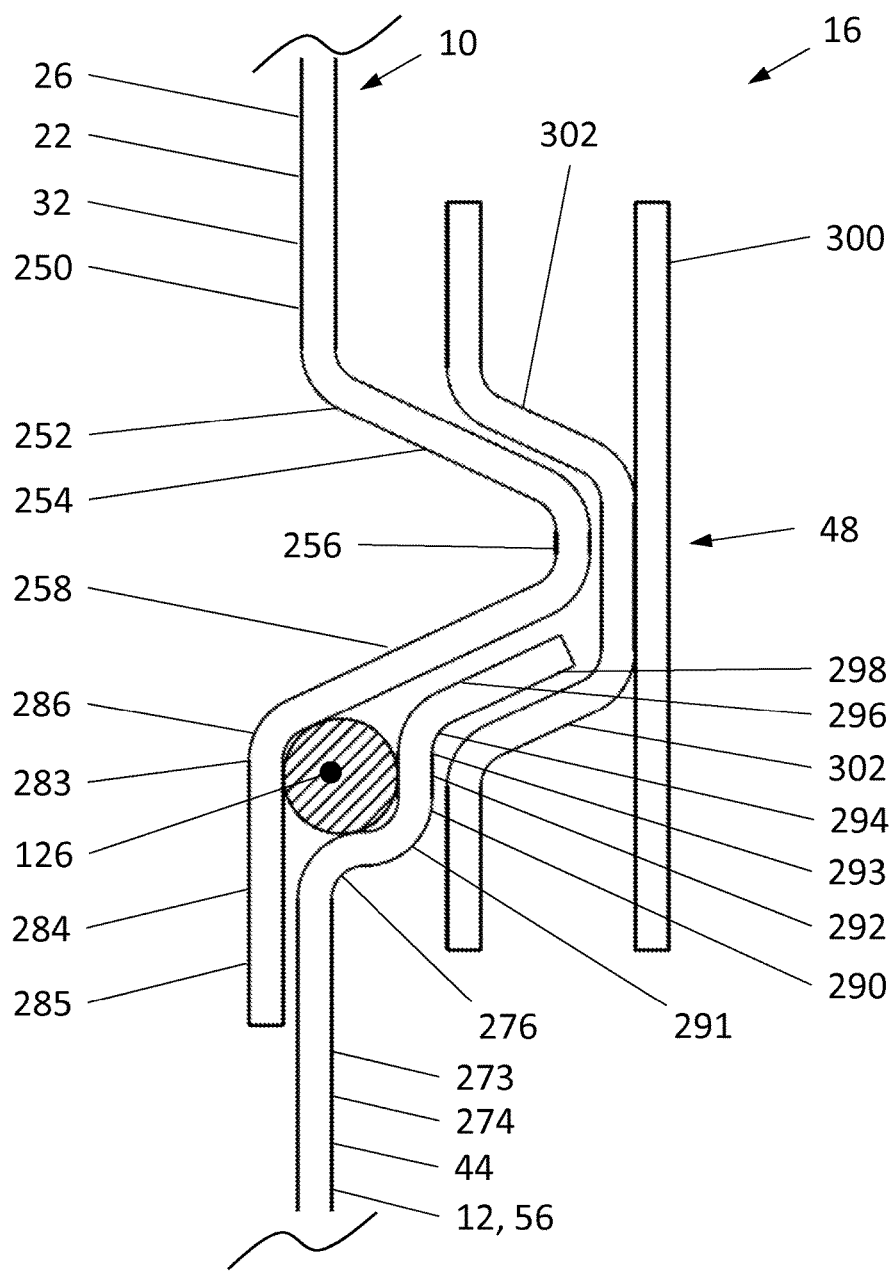

FIG. 9b shows yet another alternate design for joint 48. In this configuration, the joint system 16 includes joint 32 attached to or termed in second end portion 26 of body portion 22 of keg 10. The joint 32 has a straight cylindrical member 250 extending from second end portion 26 of body portion 22. Attached to cylindrical member 250 is a generally "V" shaped member 232 defining a first angled leg 254 connected to a curved or apex portion 236 connected to a second angled leg 258. The first angled leg 254 is attached to cylindrical member 250 and second angled leg 258 is attached to a cylindrical portion 283 at a first end 284 of cylindrical portion 283. Interposed in the first end 284 and a cylindrical portion 284 is a radiused portion 286. Attached or formed in bottom 12,56 is cylindrical conical member 273. The cylindrical conical member 273 has first end portion 274 attached to second end portion 44 of bottom 12,56. The radiused member 276 is interposed in first end portion 274 and a cylindrical conical member 290 having a first end 291 attached to radiused member 276, a second end 292 of cylindrical conical member 290 being attached to a first end 293 of a cylindrical member 294. A second end 296 of cylindrical member 294 being attached to a cylindrical conical member portion 298. An o-ring 126 is interposed in cylindrical portion 283 and radiused portion 286, radiused member 276, and cylindrical member 294. A clamp 300 having a pair of legs 302 is in contacting relationship with first angled leg 254 and cylindrical cortical member portion 298, and when tightened forms a sealed joint 48. As an alternative, joint 48 as described above could be reversed with the generally "V" shaped member 252 being formed on bottom 12 and cylindrical conical member portion 298 being formed on keg 10. As an alternative, other types of clamping systems could be used. For example, a plurality of bolts and nuts, screws or a plurality of "C" clamps could be used.

Figure 9C:
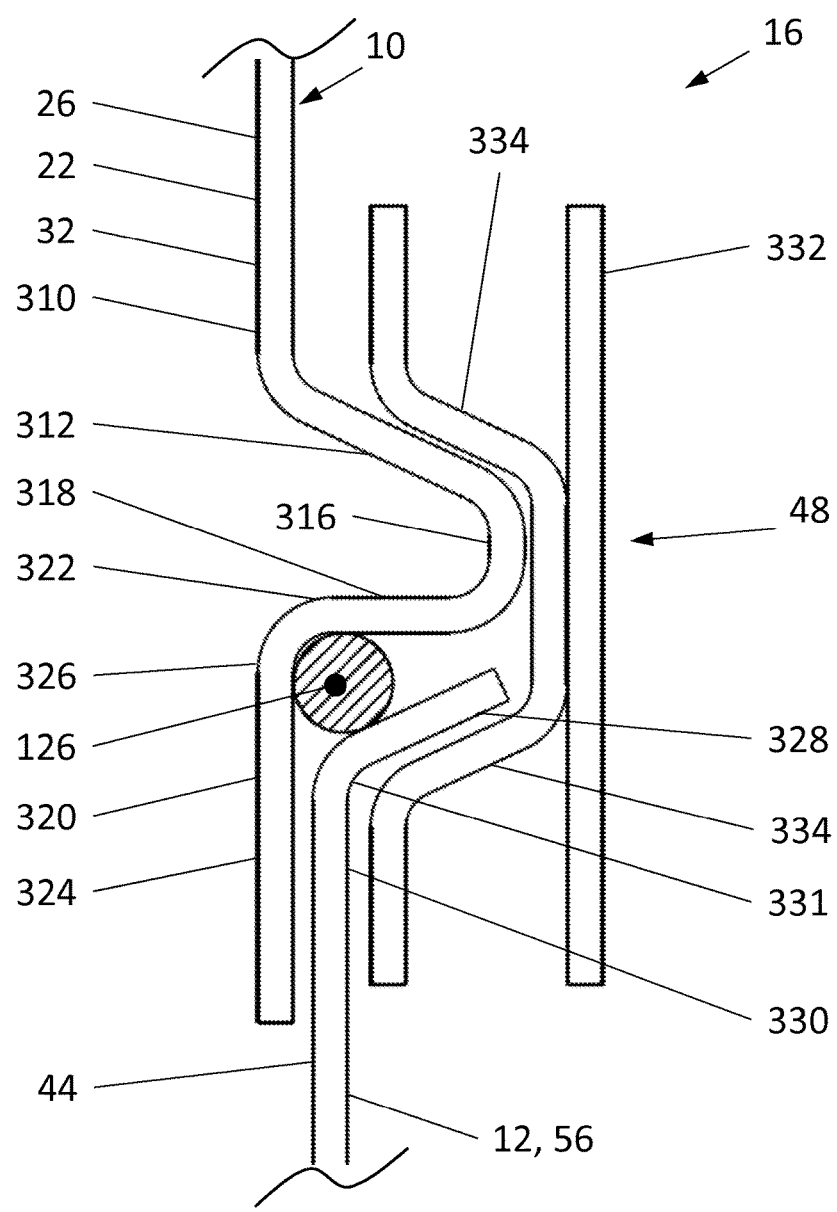
Figure 10:
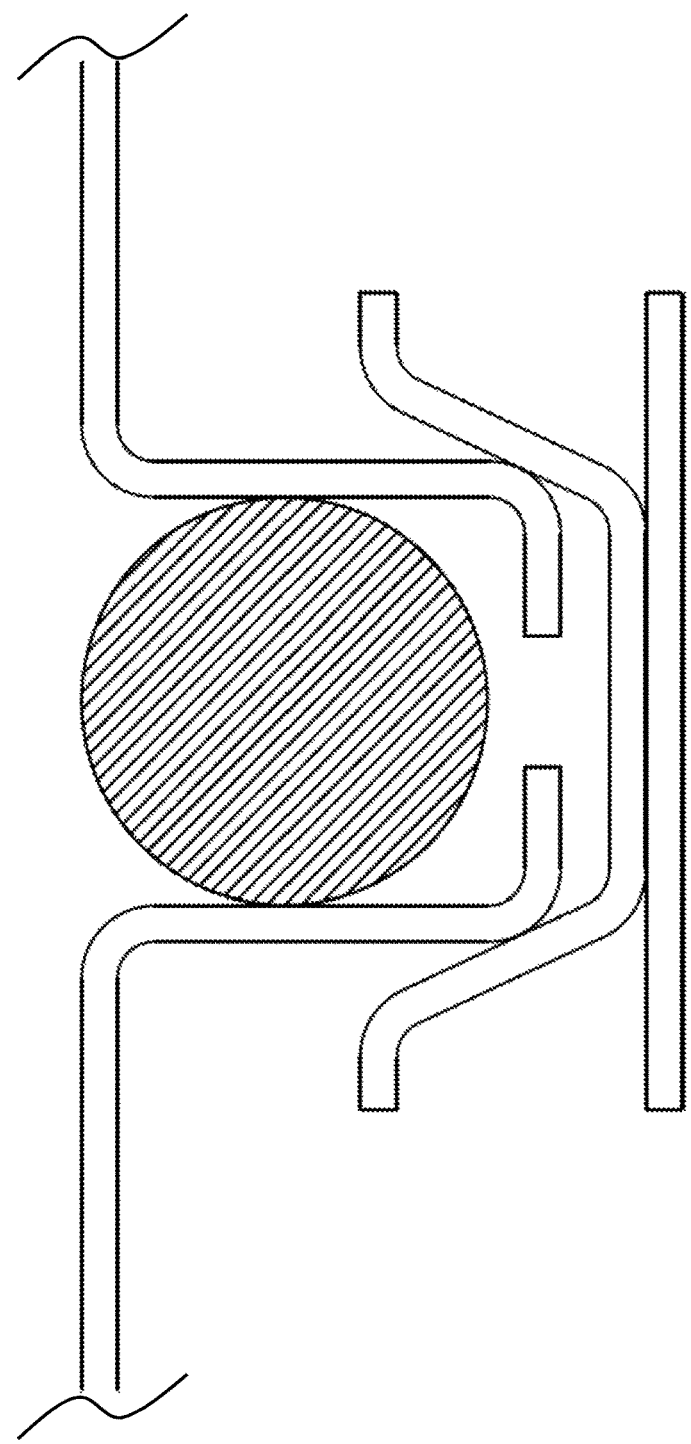
FIG. 10 is a prior art sectional view of a sealing arrangement sealably affixing at a joint.
Figure 11:
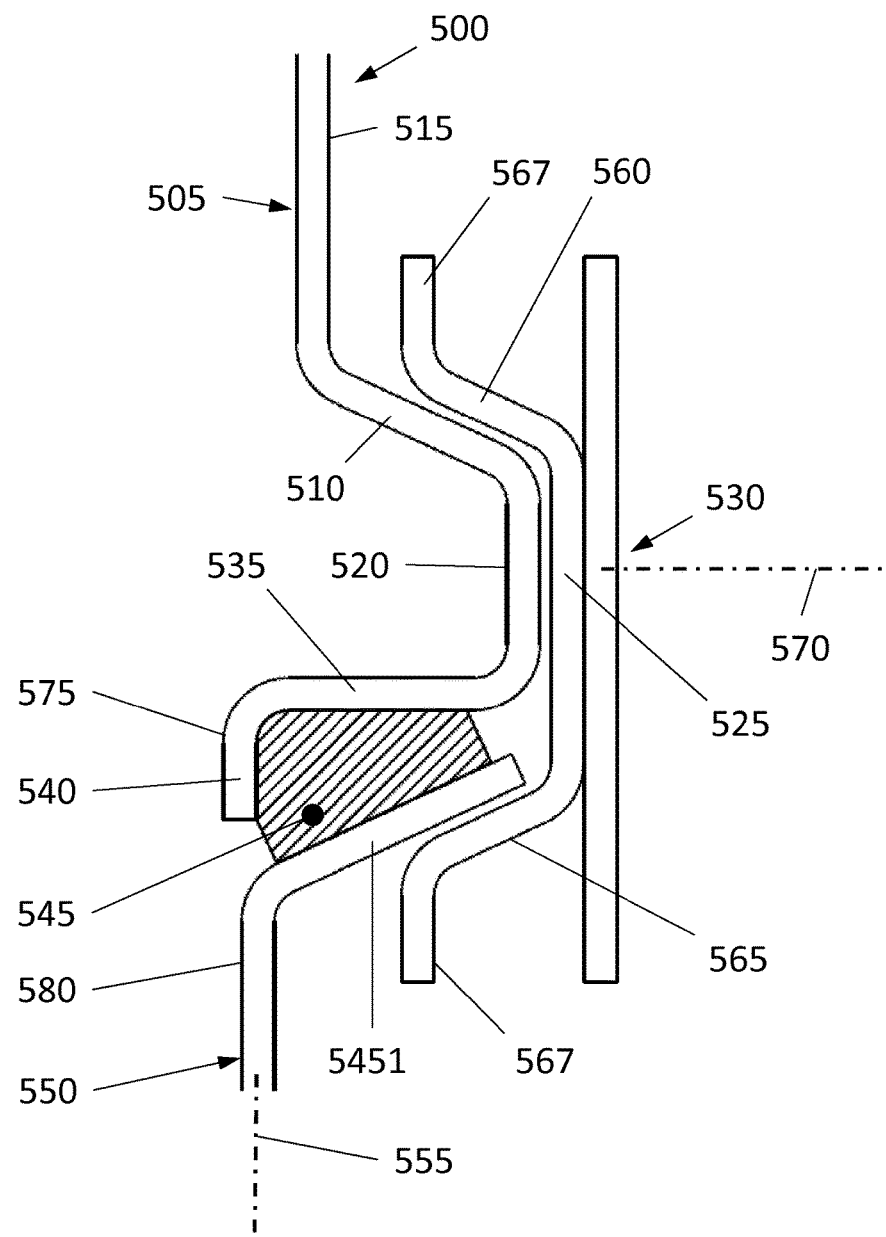
FIG. 11 is a prior art sectional view of a scaling arrangement sealably affixing at a joint.
Figure 12A:
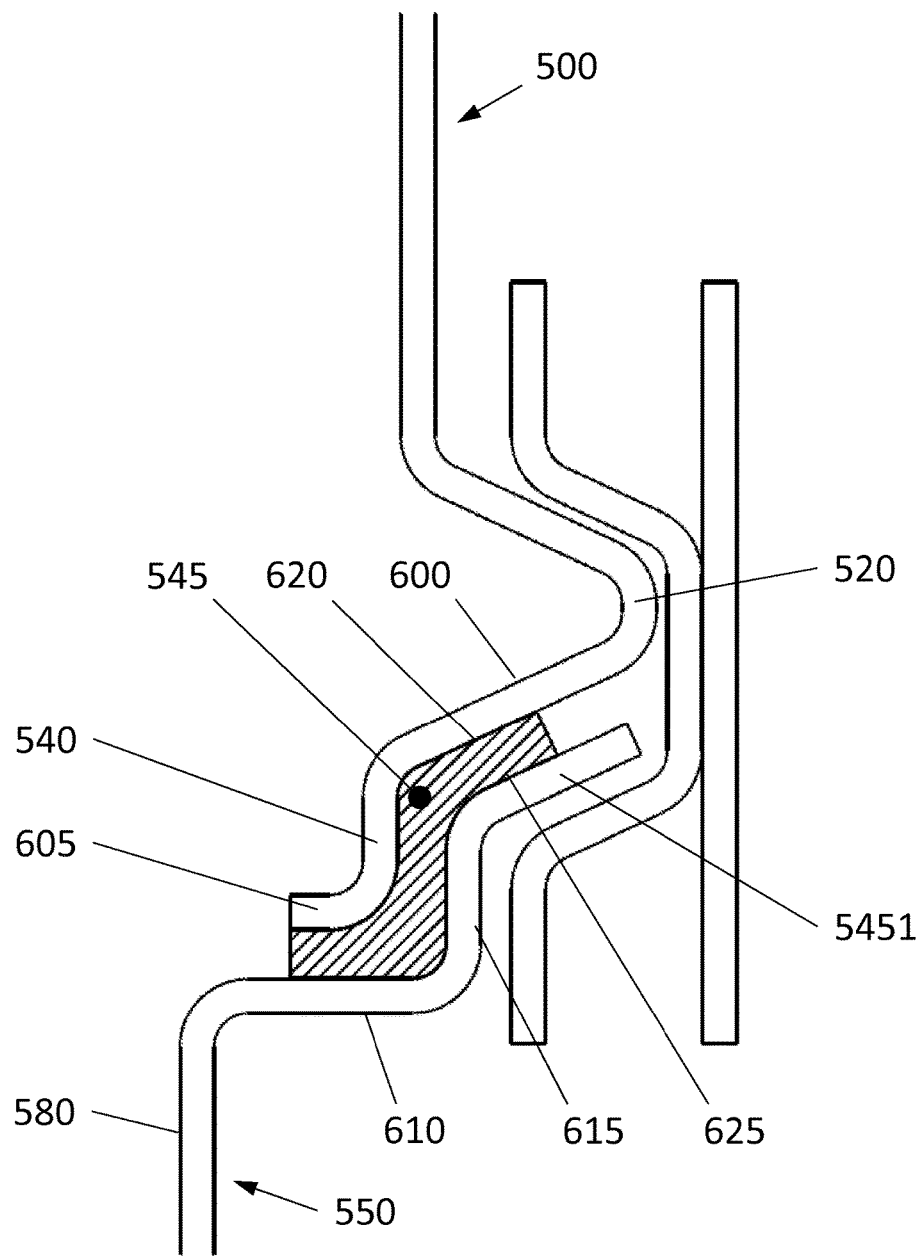
FIGS. 12a and 12b are prior art sectional views of a scaling arrangement sealably affixing at a joint.
Figure 12B:
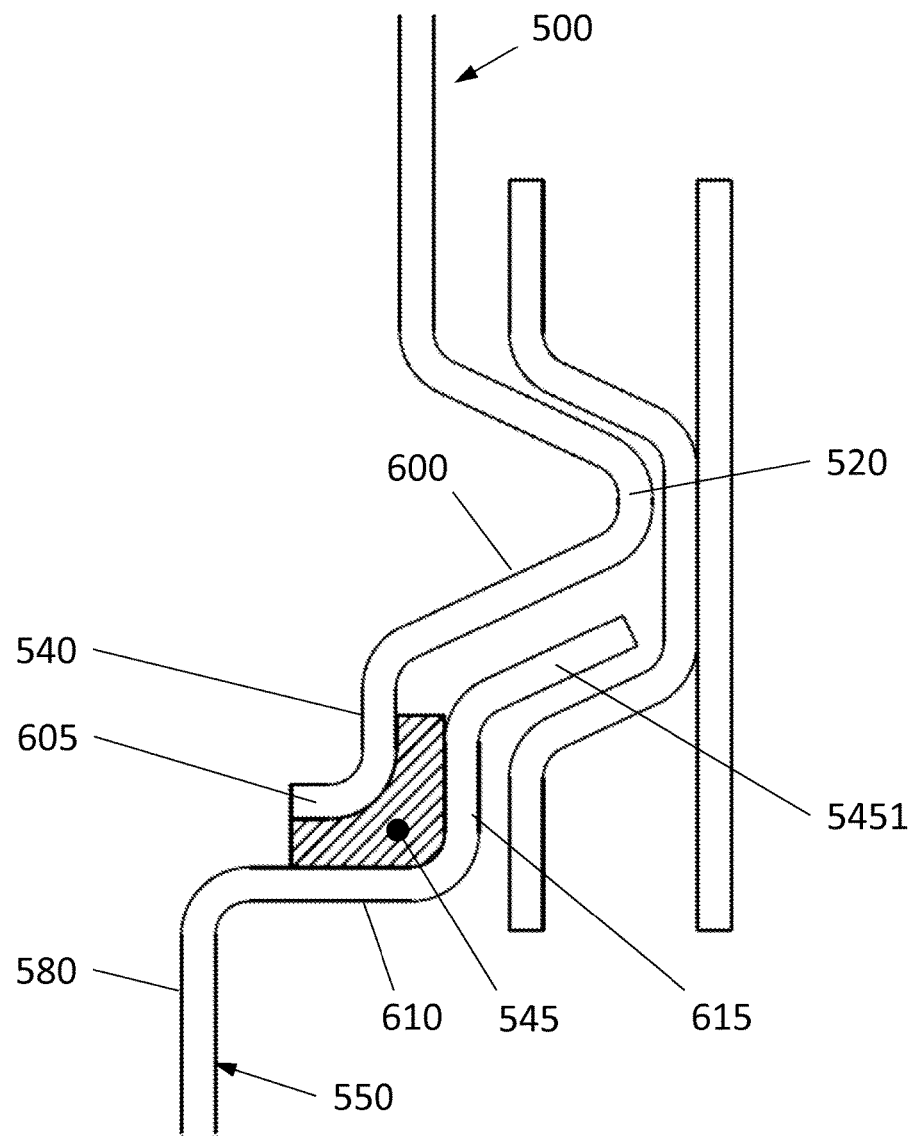

FIG. 9c shows yet another alternate design for joint 48. In this configuration, joint system 16 includes joint 32 attached to or formed in second end portion 26 of body portion 22 of keg 10. The joint 32 has a straight cylindrical member 310 extending from second end portion 26 of body portion 22. Attached to cylindrical member 310 is a somewhat "V" shaped member 312 defining a first angled leg 312 connected to a curved or apex portion 316 connected to a generally flat leg 318. The first angled leg 312 is attached to cylindrical member 310 and generally flat leg 318 is attached to a cylindrical portion 320 at a first end 322 and terminating at a second end 324 being spaced from first end 322. Interposed in first end 322 of cylindrical portion 320 and generally list leg 318 is a radiused portion 326. Attached or formed in bottom 12,56 is a cylindrical cortical member 328. The cylindrical conical member 328 has a first end portion 330 attached to second end portion 44 of bottom 12. A radiused member 331 is interposed in first end portion 330 and second end portion 44 of bottom 12,56. An o-ring 126 is interposed in cylindrical portion 320, radiused portion 326, and cylindrical conical member 328. A clamp 332 having a pair of legs 334 is in contacting relationship with first angled leg 312 and cylindrical conical member 328, and when tightened forms a sealed joint 48. As an alternative, joint 48 as described above could be reversed with somewhat "V" shaped member 312 being formed on bottom 12,56 and cylindrical conical member 328 being formed on keg 10. As an alternative, other types of clamping systems could be used. For example, a plurality of bolts and nuts, screws or a plurality of "C" clamps or threaded type clamps, a sanitary (tri-clamp) design, or a draw latch type design could be used.

INDUSTRIAL APPLICABILITY

In operation, as shown in FIGS. 1, 2, 3, 4, and 5, modular keg 10 is provided in which bottom 12,56 of keg 10 is removably affixed. The bottom 12,56 of keg 10 can be either a domed keg bottom 12 for long term storage, carbonation, and maturation, or alternately, a conical bottom 56 fitted with a drain valve 72 to facilitate sediment removal without transfer of product into a second vessel. It is understood that any general shape, material composition, or wall thickness of the keg bottom 12,36 suitable to withstand the maximum pressure of the vessel, including those shapes that are not necessarily domed or strictly conical. However, a thin walled domed shape is generally advantageous regarding portability and economics. Since only the conical portion of the vessel is needed for fermentation, the assembly of the disclosure avoids the need for a separately dedicated cylindro-conical vessel. In accord with the scope of this disclosure, any downwardly-shaped cone, with or without a substantially cylindrical straight wall section 58 that would direst yeast and sediment to the drain point, would be similarly suitable as a conical shape 56. The cylindrical straight wall section 58 does offer advantages regarding additional fermentation volume that can control blow-off and krausen formation during fermentation. Further, when switched to domed keg bottom 12, the resulting keg has little air space and reduced height, further increasing the modularity of the assembly. The function of sampling, pressurizing, and dispensing 28, 29, 31 are enabled by the features provided by the keg 10. Although the addition of a traditional racking arm or racking port is also a suitable method to drain or sample the product (e.g., for example, beer or wort), this additional feature is not required by the keg 10. The ability to switch from domed 12 to conical bottom 56 allows the brewer to ferment with the corneal bottom 56, then after fermentation simply and efficiently drain the yeast and sediment, invert keg 10 on its top, with the bottom 12,56 being upward, remove conical bottom 56, and replace it with the domed bottom 12. The keg 10 can then be re-inverted to the original orientation for storage and dispensing. Since there is no actual transfer of product, the current design offers the particular advantage wherein the user only needs to perform a simple sanitization of the keg domed bottom 12 in lieu of cleaning and sanitizing a distinct second vessel and transferring the product from the first vessel into the second vessel for carbonados and storage. In addition, the brewer can reduce total volume of vessels required for an operation by purchasing multiple bodies of keg 10 and domed bottoms 12, but will only need one or a smaller number of more elaborate, robust conical bottoms 56. For example, a brewer may couple six bodies of keg 10 with two conical bottoms 56 and four domed bottoms 12 in a potential operation. In such an operation, two vessels can be utilized for fermentation while four vessels can be used for carbonation and dispensing. Moreover, several lengths of the body of keg 10 straight wall sections could be utilized to allow for interchange between the domed 12 and conical bottoms 56 for fermenting and dispensing different batch sizes.

A conventional keg 10 could be modified such that keg 10 comprises non-exchangeable bottom by welding a conical bottom 56 onto a corny keg or Sankey keg (which are broadly available and typically mass produced) in lieu of incorporating a removable bottom 12,56. While this precludes switching to a domed bottom 12, it does eliminate the need to transfer beer to another vessel. However, the flexibility of using a modular keg 10 is lost and cleaning is again more complex.

As shown in FIGS. 6, 7, 8, 9a, 9b, and 9c, the modular keg 10 has an improved sealing system as compare to the typical, substantially flat flange or o-ring sealing systems known in the art. Although a traditional o-ring 126 is functional, the crevices necessarily created inhibit the ability to clean in place, which is a feature that is commonly desired in the art since the equipment that is suitable for such activity generally does not need to be disassembled for cleaning. However, the ability to clean in place is not required for core functionality of the disclosed modular keg 10 assembly.

It is also known that as the diameter of the vessel increases, it is difficult to maintain the position of o-ring 126. For example, an o-ring 126 under seven inches in diameter is preferred, as o-rings with larger diameters than this present a significant challenge to keep in position while maneuvering and securing the bottom 12,56 and clamp 128 into position due to the very flexible nature of the seal 126. Even with an upward-turned return flange, it does not adequately prevent seal 126 from falling toward me inside of the keg 10 during assembly. Should seal 126 move, it is possible for s leak to develop at joint system 16. Rectangular profile seals 240, while an improvement over a round profile, still exhibit the possibility of becoming dislodged during assembly, it is known that manufacturing machined o-ring groove flanges to retain o-ring 126 is impractical because of die intricate design and sophisticated manufacturing techniques that would be required. Rolled "L" shaped flanges are more readily produced with known edge rolling machinery. Therefore it is desirable to produce a seal 240 with an integral locating and affixing finger 246,248 to secure it in position on the upward turned lip of keg 10 so that it stays in place during assembly. The seal system is also capable of cleaning in place and is quite sanitary since there are no crevices to prevent cleaners and sanitizers from entering and removing soils and bacteria. Alternatively, a pressed, spun or stamped o-ring seat with a mating profile to secure the seal 126,240 would also be more economical than machined seats, although more difficult and costly than the "L" shaped flanges and does not meet cleaning in place objectives. With the addition of a flat sealing lip to the edge of the o-ring, a more sanitary seal that facilitates cleaning in place can be formed. Lastly, a nesting design with a rolled "V" flange with an o-ring sealing surface and a mating flange with an angled flange is also readily manufactured and assembled. The extended hp on the V flange portion retains the o-ring in place, and also aligns and retains the bottom in place while clamping. It is understood that these profiles could be inverted whereby the V portion with o-ring is on the vessel bottom portion.

For fermentation, an airlock or similar vent is provided to vent fermentation gasses, although it is understood that fermentation can proceed under pressure using a relief valve suitable for venting gas at a safe pressure level. The main advantage is the ability to naturally carbonate the beer and the suppression of esters during fermentation.

What is claimed is:

1. A fermentation assembly comprising:
a keg body having a first end and a second end on opposing ends of the keg body and a wall of the keg body able to withstand at least about 5 psi of internal pressure;
a top member that is fixedly joined to the first end of the keg body;
a joint formed at the second end of the keg body;
a first removable bottom member, comprising:
a first end portion, a second end portion, a domed member, a sealing joint piece, and a leg portion,
wherein the domed member extends from the first end portion to the second end portion to form the bottom of the first removable bottom member and the leg portion extends between the first portion and second portion and is configured to support the assembly in an upright position when the first removable bottom member is coupled to the keg body at the joint; and
a second removeable bottom member, comprising:
a first end portion, a second end portion, a cylindrical wall portion having a first end portion spaced a pre-established distance from a second end portion, a conical wall portion having a first end portion spaced a pre-established distance from a second end portion;
wherein the second end of the keg body interchangeably, sealably joined at the joint to either the first removable bottom member or the second removable bottom member via a sealing joint system;
wherein the first removable bottom member excludes a liquid-in/gas-out port; and
wherein the first end portion of the second removable bottom member is configured such that a cross-sectional area of the first end portion is less than 33% of a cross-sectional area of the second end portion, and such that the second end portion sealably joins with the second end of the keg body at the joint using the sealing joint system.

2. The fermentation assembly of claim 1 wherein the second removable bottom has a volume of at least about 5% of the keg body, wherein the volume is configured to catch sediment and yeast during fermentation.

3. The fermentation assembly of claim 1 wherein the keg body is cylindrical.

4. The fermentation assembly of claim 1 wherein the keg body further comprises a plurality of passages positioned within the keg body, including a gas admission passage and a liquid dispensing passage.

5. The fermentation assembly of claim 1 wherein the first removable bottom member is domed to provide a flow of sedimentary material toward the domed area of the bottom member.

6. The fermentation assembly of claim 1 wherein the first removable bottom member is concave.

7. The fermentation assembly of claim 1 wherein the top member has an opening and a removable access hatch.

8. The fermentation assembly of claim 1 wherein the top member includes a handle portion.

9. The fermentation assembly of claim 1 further comprising a pressure relief system.

10. The fermentation assembly of claim 1 wherein the leg portion has a segmented configuration.

11. The fermentation assembly of claim 1 wherein the second removable bottom member is conical.

12. The fermentation assembly of claim 1 wherein the second removable bottom member further comprises a racking arm.

13. The fermentation assembly of claim 1 wherein the first end portion of the second removable bottom member is in communication with a valve.

14. The fermentation assembly of claim 1 wherein the sealing joint system comprises:
   a clamp;
   a seal;
   a straight cylindrical member extending from the joint at the second end of the keg body;
   a first cylindrical member having a first arched; and
   a second joint formed on the second end portion of the first removable bottom member and the second removable bottom member having a second cylindrical first arched portion of a second cylindrical member; wherein the second end of the keg body is sealably joined to either the first removable bottom member or second removeable bottom member via the sealing joint system.

15. The fermentation assembly of claim 1 wherein the second removable bottom member is conical having a volume of at least about 0.33 gallons.

16. The fermentation system of claim 14 wherein the clamp includes two legs that are in contact with a pair of cylindrical flange members.

17. A fermentation assembly comprising:
   a keg body having a first end and a second end on opposing ends of the keg body and a wall of the keg body able to withstand at least about 5 psi of internal pressure;
   a top member that is fixedly joined to the first end of the keg body;
   a first joint at the second end of the keg body having a straight cylindrical member extending from the second end of the keg body;
   a removable bottom member having a first end portion and a second end portion, wherein a second joint is formed at the second end portion; and
   a sealing joint system comprising:
      a clamp, a first leg and a second leg;
      a seal;
      a first cylindrical member formed defining a first leg, a bottom, and a second leg, wherein the first leg is attached to the cylindrical member and the second leg is attached to a first arched portion of a first cylindrical flange member;
      and
      a second cylindrical member formed defining a first leg, a bottom, and a second leg, wherein the first leg is attached to the second cylindrical member and the second leg is attached to a first arched portion of a second flange member;
      wherein the second end of the keg body is sealably joined to the second end of the removable bottom member via the sealing joint system by positioning the seal in between the arched portion of the first cylindrical flange member and the first arched portion of the second flange member, and the first leg and the second leg of the clamp contacts the first cylindrical member and the second member respectively to provide a sealed joint between the keg body and the removable bottom member.

18. The fermentation assembly of claim 17, wherein the removeable bottom member has a domed member extending from the first end portion of the removeable bottom member to the second end portion of the removeable bottom member, and is configured to form a domed surface.

19. The fermentation assembly of claim 17, wherein the removeable bottom member is conical in shape.

20. The fermentation assembly of claim 17, wherein the first end portion of the first removeable bottom member is configured such that the cross-sectional area of the first end portion is less than 33% of a cross-sectional area of the second end portion, and such that the second end portion sealably joins with the second end of the keg body.

21. The fermentation assembly of claim 20, wherein the first removeable bottom member is in communication with a valve having an open position and a closed position.

22. The fermentation assembly of claim 21, wherein the valve facilitates a removal of sediment when a product in the fermentation assembly is transferred from the fermentation assembly to a second vessel.

23. The fermentation assembly of claim 22, further comprising a racking arm configured to drain a liquid contained in the fermentation assembly.

* * * * *